Aug. 7, 1934.　　　　　A. RUPP　　　　1,969,664
PROPELLER HUB
Filed Jan. 29, 1932　　　　3 Sheets-Sheet 1
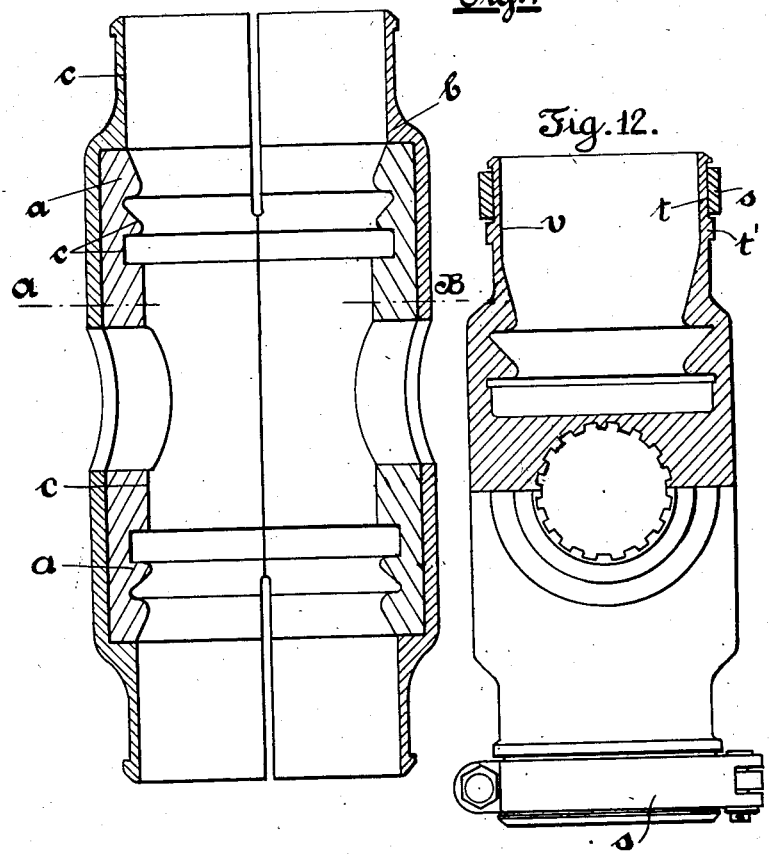
Fig.1
Fig.12.
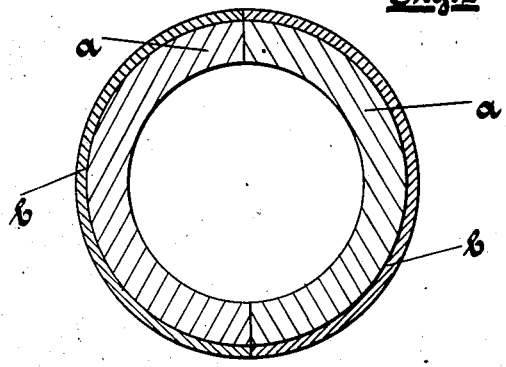
Fig.2
Inventor:
Albert Rupp
By:
Munn & Co.

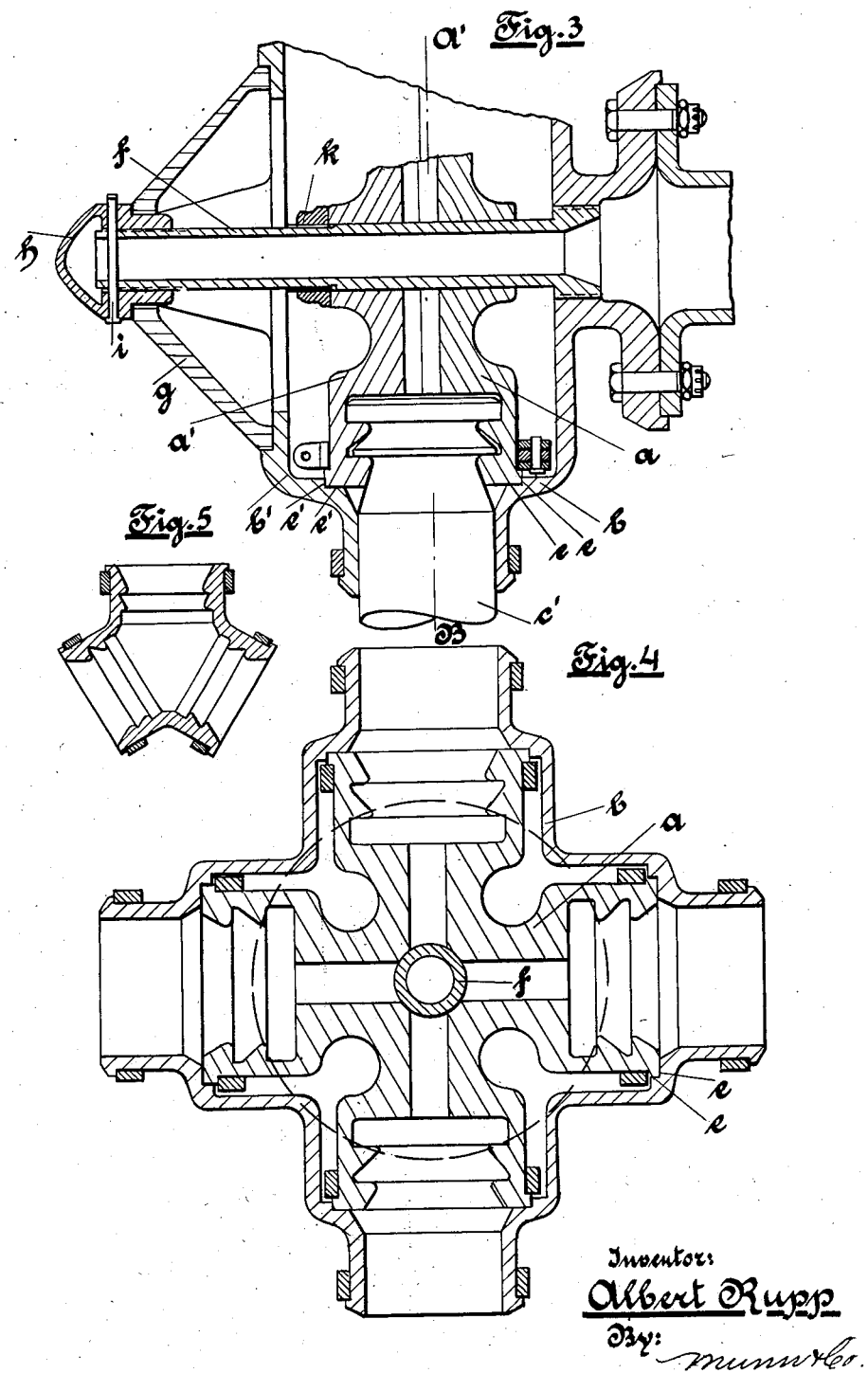

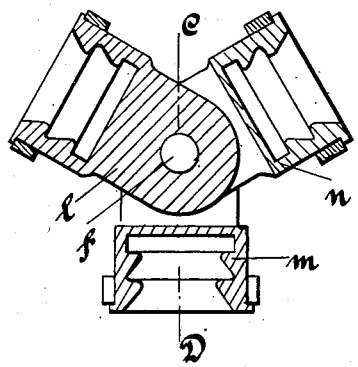
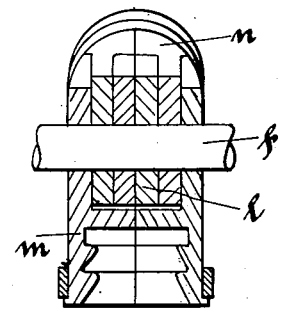
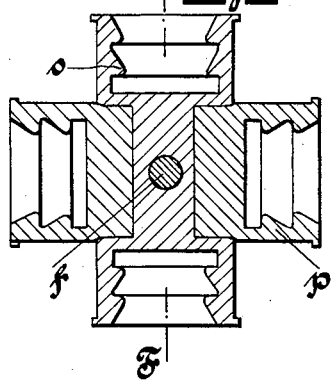
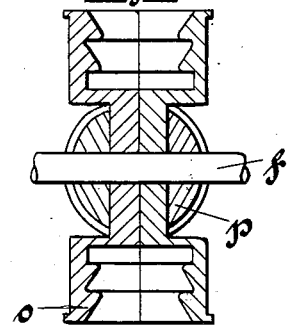
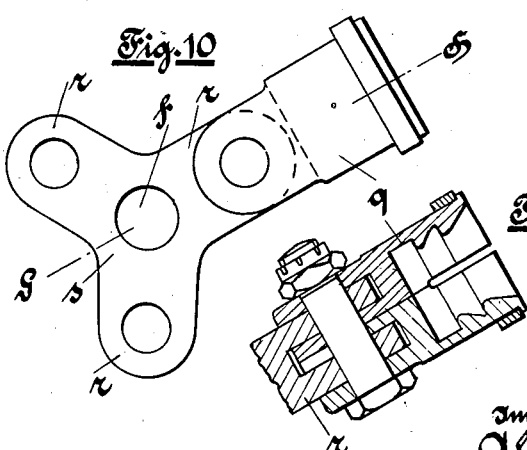
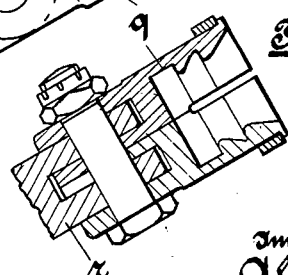

Patented Aug. 7, 1934

1,969,664

UNITED STATES PATENT OFFICE 1,969,664

PROPELLER HUB

Albert Rupp, Berlin-Tempelhof, Germany

Application January 29, 1932, Serial No. 589,749
In Germany August 28, 1931

7 Claims. (Cl. 170—173)

The hub of a propeller is about the most important part in the design of an aeroplane or other aircraft. It is required to be able to withstand the greatest possible stresses which may be put upon it, and must be of the smallest possible weight at the same time; and it is upon their absolute reliability that the safety and reliability of the aircraft depends to a very large degree, so that any real improvement made in the design and construction of the propeller hub is of the greatest importance for the art of designing aircraft.

It is a well known practice to construct the propeller boss or hub of a steel body in the case of adjustable propellers.

The essential purpose of the present invention is a solution of the problem to make the design of the propeller, hub, stronger, safer and lighter.

This purpose is attained by making the hub proper of two separate members, viz. the core member and a jacket or shroud member; of these two members the one that has to take up the greater strains and stresses, especially those of the centrifugal forces, is made of a specially strong material such as for instance steel, whereas the other part, which is not subjected to such high stresses and which has for instance mainly to take care of the transmission of the torsional moment, is constructed of a much lighter material. In the case of one of the constructional forms the core piece or member of the hub absorbs the centrifugal forces and the jacket transmits the torsional or rotational stresses.

In the case of a further constructional form, the core piece is composed of several individual component parts which accommodates the air propeller blades. The hub core member may be mounted on one or more supporting members. The trunnion of the motor shaft is preferably fitted into the core member of the hub. Central members for the fixing of the propeller blade feet or roots, which may be angularily displaceable in relation to one another, may be provided on the motor shaft trunnion.

The invention is not only intended for the usual means of mounting propellers, but is especially also intended for such designs, wherein the hub of the propeller is mounted so that it can be easily loosened.

The accompanying drawings illustrate the invention by means of several embodiments by way of example:—

Fig. 1 is a longitudinal section through one of the constructional forms of the body of the hub.

Fig. 2 is a section according to line A—B of Fig. 1.

Fig. 3 is a longitudinal section through another embodiment.

Fig. 4 is a section according to line $A^1 B^1$ of Fig. 3.

Fig. 5 is a section through a core member.

Fig. 6 is a section through a core member, which however consists of an individual component part for each propeller blade.

Fig. 7 is a section along line C—D of Fig. 6.

Fig. 8 is a section through a core member, wherein two propeller blades are inserted in each component member of the core.

Fig. 9 is a section according to line E—F of Fig. 8.

Fig. 10 is a view according to which the sheaths or sleeves which carry the propeller wings are articulated to a supporting member.

Fig. 11 is a section according to the line G—H of Fig. 10.

Fig. 12 is a longitudinal section through another embodiment of the invention, partially shown as a front view.

In the case of the embodiment shown in Figures 1 and 2 the two members of the boss or hub consist of a hub proper $a$ and a jacket or shroud $b$ which surrounds the said hub proper. The shroud is of a sectional construction (note the diverse crosshatching in Figs. 1, 2 and 3) so as to enable the insertion of the hub or, what amounts to the same thing, enable the assemblage of the shroud around the hub. Both these members are provided with suitable fitting surfaces $c$ which fit the foot of the air propeller blade. The whole unit of the boss or hub is adapted to be mounted by means of any of the known suitable means on the crank end of the motor shaft. The hub shown is a so-called adjustable propeller hub.

In the case of the embodiment shown in Figures 3 and 4 a core member is used that is mainly intended to take up the centrifugal forces, whereas the jacket serves for the transmission of the rotational moment. By the use of a suitable light metal, for example duraluminum, especially for the jacket member, the hub unit becomes of a much lighter design. It is also possible, if the core piece is made in the form of several pieces, (and this is a feature of outstanding advantage) to build individual members of the unit hub with one, two or more air propeller blades in the case of air propellers with several blades, of one piece with the corresponding part of the hub proper, they being, on assembly, inserted into the jacket member.

Another advantage of a divided core or hub lies in the fundamentally sound foundation which is afforded. To explain: The hub is the member which makes direct connection with the crankshaft. For all purposes it is integral with the crankshaft. Now by making the hub in divided form, the act of mounting the hub upon the crankshaft is an act practically simultaneous with assembling the several elements around the inner ends of the propellers. Now by virtue of the interlock between the propellers and hub the propellers virtually become integral with the crankshaft so as to provide an absolutely firm anchorage.

According to the embodiment shown in Figures 3 and 4, the hub consists of a plural-part core member $a, a^1$ and a jacket or sheath member $b, b^1$. The core and the jacket members are both designed in two parts, so as to suit the shape of the feet of the propeller.

The core and jacket members are held together in the manner known per se at the external points and are clamped securely together with the air propeller blades $c^1$. The core piece $a, a^1$ fits by means of the surfaces and spigots $e, e^1$ into the jacket member $b, b^1$.

This centering of the core piece $a, a^1$ may however also be effected by means of conical seating surfaces, and it is of course also possible to choose and use other means and devices for centering, such as for instance by using wedges, pins or recesses, and they may also serve as additional means of support. These special centering means may also be adapted for use in conjunction with the centering of the jacket. It is also possible by reason of this arrangement of the shaft trunnion $f$ to ensure a central pressing together of the core piece and the cover piece. In this case the jacket member part $b^1$ is pressed against the jacket member $b$ by means of the use of the hood or end bracket $g$ known per se and by means of the central nut $h$ is secured against coming loose in the embodiment shown, by known means and devices for instance by means of the safety bolt $i$ and the pin.

This enables at the same time the core piece $a, a^1$ to be forced against the jacket member $b^1$. The core piece $a, a^1$ can furthermore also by itself be pressed or compressed together by means of the central nut $k$ and can also thereby be pressed against the jacket $b$. There further exists the possibility to combine the central nuts $h$ and $k$ which may then be made to press on the jacket member $b^1$ as also on the core piece $a^1$.

The design of the core piece $a, a^1$ may also be as shown in Figure 5 in contradistinction to the design shown in Figure 4 where the core piece is fitted on to the shaft trunnion $f$.

According to Figures 6 and 7, the core piece may also consist of individual members $l, m, n,$ which are mounted on the common shaft trunnion $f$, and are displaceable and adjustable thereon.

A further modified design of the core piece is shown in Figures 8 and 9. A pair of air propeller blades are united to an individual unit by means of the members $o$ and $p$ of the core of the hub. These members $o$ and $p$ may in this case also just as in the embodiments shown in Figures 3 and 4, be fitted on the shaft trunnion $f$.

Figures 10 and 11 show a design similar to that shown in the Figures 6 and 8. But according to this embodiment the individual members $q$ of the core into which the air propeller blades are inserted, are connected to the arms or lugs $r$ of a supporting member $s$, which can also, as previously mentioned, be mounted on the shaft trunnion $f$.

The modification according to Figure 12 relates to an adjustable propeller, where the boss or hub is pressed against the inserted blades by means of tensioning rings, a flange being provided at the outer side of the hub arm, which securely prevents any slipping off of the ring. In the case of the embodiment according to Figure 12 the tensioning rings $w$ are fitted into the groove $t$ of the hub. This arrangement presents, in comparison with the hitherto customary designs where no projection $t^1$ is provided, the advantage that the tensioning rings are fully secured against any lateral displacement, and are not, as hitherto, at different distances from the centre of the hub.

The projection $t^1$ also forms a reinforcement of the hub, so that the whole surface $v$ fits and presses against the foot or root of the propeller blade.

I claim:—

1. Hub for propellers comprising a core member made up of an assembly of several small elements mutually connected, recesses in said elements to accommodate propeller blades, and a sheath fixedly surrounding the assembly.

2. Hub for propellers comprising a core member designed to withstand centrifugal forces and made up of an assembly of several socketted blade holders connected to a centre-piece having radiating arms for such connection, and a sheath of light metal fixedly surrounding the assembly.

3. A propeller hub assembly comprising a hollow inner core secured to a separate outer sheath, a shaft trunnion adapted to fit the hollow inner core, and central fixing members mounted on the trunnion.

4. Hub for propellers having an inner plural-part core to fit around the root of at least one blade, tensioning rings around said parts to press them against said root, and an outer sheath member encasing and being secured to said core.

5. Hub for propellers having an inner plural-part core, a tensioning ring on said core to clamp it onto a blade root, a projecting integral reinforcing ring around the edge of said core, and a separate outer sheathed member secured to said core.

6. A hub for propeller blades which have laterally extending projections, said hub comprising a divided core bored to receive a motor shaft and being provided with grooves conforming with and arranged to receive the lateral projections of the propeller blades, means for rigidly clamping the core members to the projections, and a light metal sheath surrounding the core and rigidly secured to the core and to the propeller blades.

7. The combination with a plurality of propeller blades, each having a foot provided with laterally extending circular flanges, of a split hub core having grooves in its individual members conforming with and arranged to receive the flanges of the propeller blades, means for clamping the core parts to the propeller blades in any of the angularly adjusted positions of the propeller blades, and a reinforcing sheath having a main body portion spaced from the core, and outer portions arranged to engage the core, and means for securing the sheath to the core and to the propeller blades for rigidly connecting the parts together.

ALBERT RUPP.